Nov. 10, 1953  A. HAGE  2,658,260
MILLING CUTTER
Filed Feb. 26, 1952

INVENTOR.
ALBERT HAGE
BY
ATTORNEY

Patented Nov. 10, 1953

2,658,260

UNITED STATES PATENT OFFICE 2,658,260

MILLING CUTTER

Albert Hage, Toledo, Ohio

Application February 26, 1952, Serial No. 273,377

1 Claim. (Cl. 29—103)

This invention relates to milling cutters, and an object is to produce a new and improved milling cutter which greatly decreases the cutting or load stress on the teeth when in use; provides increased strength in the weakest region; is so designed that tooth breakage is reduced, thereby substantially prolonging the life of the cutter; and can be economically manufactured and maintained in good working condition at reasonable cost. This application is a continuation-in-part of my co-pending application Serial No. 35,411, filed June 26, 1948, entitled Milling Cutter, and now abandoned.

Another object is to provide a milling cutter having a V-shaped cutting edge capable of producing a square or straight-bottom cut, and yet having a reenforcing web of substantial thickness trailing the cutting edge. To this end, it is intended that the V-shaped cutting edge be equidistant at all points along the V, from the axis of the cutter, and that the outer surface of the reenforcing web be slightly concave behind the cutting edge.

Still another object of the invention is to provide for disposition of the metal peeled off the work by V-shaped, positively raked cutting teeth. More particularly, it is now proposed that the base of each cutting tooth be formed with outwardly disposed plow-like surfaces which at the base of the tooth, curve continuously from the surfaces framing the V at the tooth front, and thence merge with the flat sloping back surface of the next preceding tooth. In addition, the apex of the V is continued forwardly for a short distance, in concave curvature, from the bottom of the tooth front and thence merges into the flat sloping back of the preceding tooth. The curved, outwardly inclined pockets thus formed at the bases of the tooth fronts shed the peeled metal outwardly so that it will not build up between the teeth.

Other objects and advantages of the invention will hereinafter appear, and for purposes of illustration but not of limitation, an embodiment of the invention is shown on the accompanying drawings, in which Figure 1 is a side elevation of a milling cutter;

Figure 1:
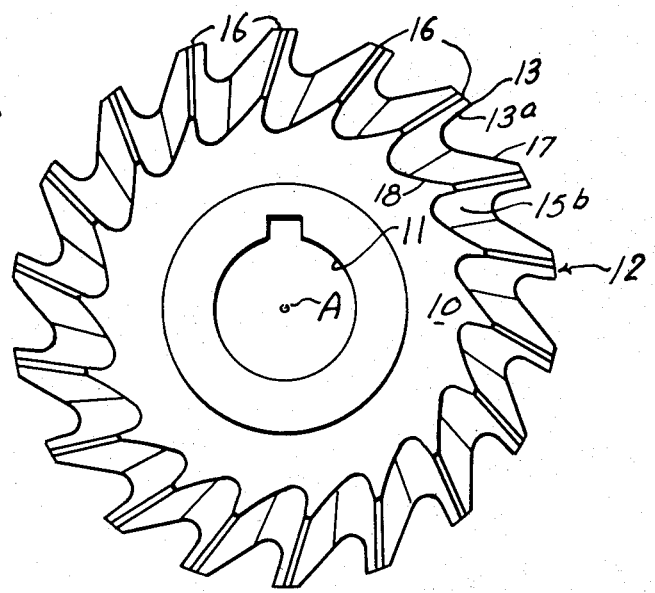
Figure 2:
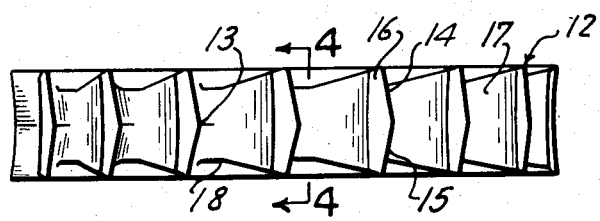
Figure 2 is a top plan view or edge elevation of the cutter shown in Figure 1.
Figure 3:
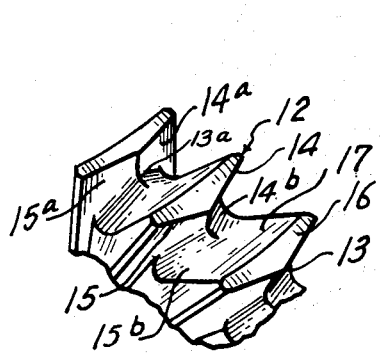
Figure 3 is a perspective view showing the teeth of the cutter shown in Figure 1.
Figure 4:
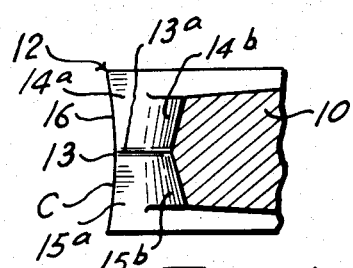
Figure 4 is an enlarged transverse sectional view on the line 4—4 of Figure 2.

The illustrated embodiment of the invention comprises a rotary milling cutter including a body 10 having a central opening 11 to fit a rotating spindle to which it may be keyed. The body 10 has an annular row of cutting teeth 12, which, in this instance, are integral with the body, the entire structure being a suitable metal produced from a casting or forging or suitable bar stock suitably machined to achieve the desired contour.

Each tooth 12 has a pointed cutting edge 13 from opposite sides of which incline rearwardly straight cutting edges 14 and 15. Cutting edges 14 and 15 are, at all points along their lengths, equidistant from the axis A of the cutter. At the outer side is a land 16 which is slightly concaved as denoted at C so that the cut will be square or with a straight bottom. Directly in rear of the land 16, the tooth tapers gradually rearwardly as indicated at 17, providing a flat surface, the sides of which converge as shown, thereby affording shouldered body portions 18 on opposite sides of the rear sloping wall 17.

Beneath and flush with the pointed cutting edge 13 is a straight vertically disposed apical edge 13a, which inclines rearwardly and in radial direction, at an angle of the order of 15° as related to the radius of the body 10 intersecting the pointed cutting edge 13. Similarly straight, vertically disposed walls 14a and 15a incline rearwardly and in a radial direction at an angle, these walls extending directly from the respective cutting edges. The lower or inner edges of the walls 14a and 15a merge or blend by outwardly inclined concave curvilinear surfaces 14b, 15b with the sloping rear wall 17 of the tooth directly in advance, while the apical edge 13a concavely curves forwardly and thence merges into flat surface. Thus the tooth bases are plow-like so as to feed the cut metal away to each side of the cutter. It is to be understood that the expressions "rearwardly" and "advance" as used, are employed with respect to the direction of rotation of the cutter when in operation.

It will be observed that the milling cutter has the pointed cutting edges 13 of the teeth disposed midway of the transverse width or thickness of the peripheral surface so that the straight cutting edge portions 14 and 15 are of the same length.

In the operation of the cutter, it will be manifest that a dual peeling or shearing action by the straight cutting surfaces 14 and 15 achieves the desired result more efficiently with less load or stress on the teeth. Ordinarily, the weakest portion of the tooth of a milling cutter is the point, but in this instance, the pointed cutting edge 13 has the greatest or strongest backing, due to the sloping backing wall 17. This is found greatly to militate against tooth breakage. The curvilinear surface 18 enables cuttings to be readily discharged and prevents them pocketing or interfering with the work.

It is to be understood that numerous changes in details of construction, arrangement and operation may be effected without departing from the spirit of the invention especially as defined in the appended claim.

What I claim is:

A milling cutter comprising a metallic cylindrical body having an annular row of teeth on the peripheral surface thereof, each of said teeth having an intermediate pointed cutting edge and straight rearwardly inclined oppositely extended cutting edges tapering from said pointed edge rearwardly with respect to the direction of rotation of said body and each inclined cutting edge terminating at a side edge of the respective tooth, said teeth having lands concave transversely of the circumference rearward of the cutting edges and struck substantially on the arc of the circle, the radial surface of each tooth raking rearwardly relative to the direction of rotation and terminating in an outwardly inclined curved shallow concave pocket so as to form a plow-like base at the tooth front, and an integral backing for each tooth merging with the concave pockets of the next succeeding tooth.

ALBERT HAGE.

References Cited in the file of this patent

UNITED STATES PATENTS

| Number | Name | Date |
|---|---|---|
| 258,568 | Crane | May 30, 1882 |
| 1,529,917 | Redinger | Mar. 17, 1925 |
| 2,010,353 | Edgar | Aug. 6, 1935 |
| 2,183,932 | Robbins | Dec. 19, 1939 |
| 2,346,343 | Aber | Apr. 11, 1944 |
| 2,476,749 | Marsh | July 19, 1949 |